United States Patent [19]

Kilham

[11] 4,102,308
[45] Jul. 25, 1978

[54] BIRD FEEDER

[75] Inventor: Peter Kilham, Foster, R.I.

[73] Assignee: Droll Yankees, Inc., Foster, R.I.

[21] Appl. No.: 722,069

[22] Filed: Sep. 8, 1976

[51] Int. Cl.² ............................................. A01K 39/00
[52] U.S. Cl. ................................. 119/52 R; 119/51 R
[58] Field of Search ..................... 119/51 R, 52 R, 53, 119/63, 51 FS

[56] References Cited

U.S. PATENT DOCUMENTS

| | | | |
|---|---|---|---|
| 2,696,803 | 12/1954 | Deffenbaugh | 119/52 R |
| 2,705,938 | 4/1955 | Greenough | 119/52 R |
| 2,804,844 | 9/1957 | Gigliotti | 119/52 R |
| 2,866,435 | 12/1958 | Blazier | 119/53 |
| 3,648,661 | 3/1972 | Moore | 119/53 |
| 3,780,703 | 12/1973 | Boehland, Jr. | 119/53 |
| 3,848,570 | 11/1974 | Scigliano | 119/51 R |
| 3,977,363 | 8/1976 | Fisher, Jr. | 119/52 R |
| 4,030,451 | 6/1977 | Miller | 119/51 R |

Primary Examiner—Jay N. Eskovitz
Attorney, Agent, or Firm—Salter & Michaelson

[57] ABSTRACT

A bird feeder construction adjustable for feeding birds exhibiting all kinds of feeding behavior patterns including, for example, birds which feed while perched and birds which feed while in a clinging position. In general the construction includes a feed assembly having a container portion and a platform portion, the container including an open top defining an upper feed access for nonclinging or perch type feeding birds and the platform provided with a plurality of openings forming lower feed access openings for small cling feeding type birds. In addition, a hood member is provided so as to protect the feed assembly from the elements and unwanted species including large birds, squirrels, and the like. Also, means are provided for enabling the feed assembly to be independently pivotally movable with respect to the hood member.

26 Claims, 7 Drawing Figures

U.S. Patent  July 25, 1978  Sheet 1 of 2  4,102,308
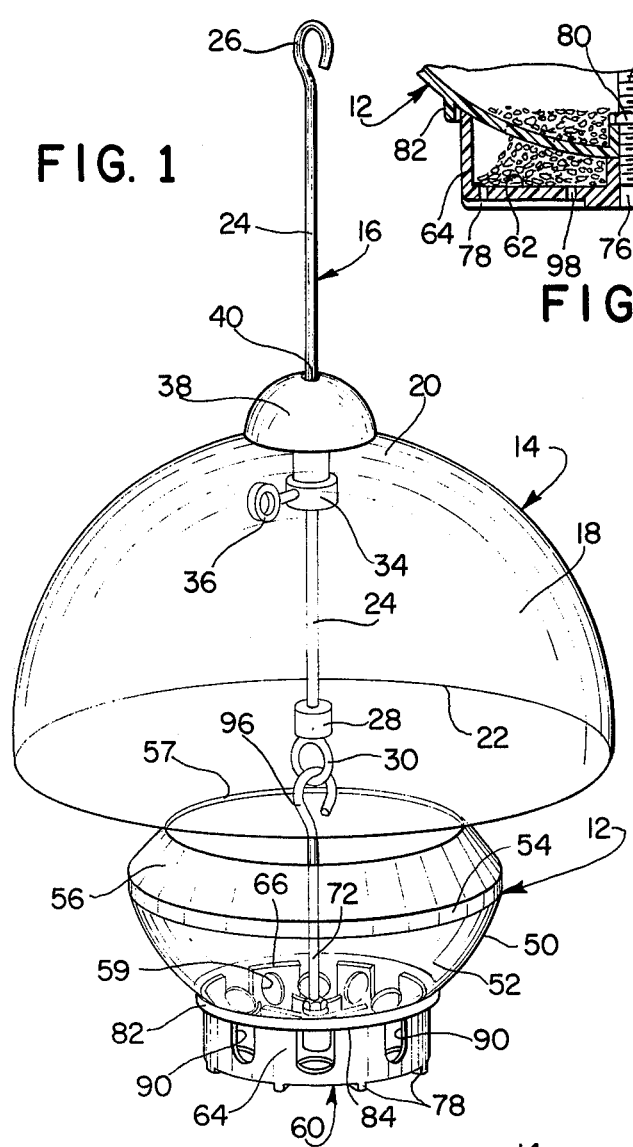

BIRD FEEDER

BACKGROUND OF THE INVENTION

Birds exhibit a variety of feeding behavior patterns, and maybe classified by such habits, i.e., as perch and clinging type feeders. Thus birds such as evening grosbeaks and cardinals like to feed in an upright or perch position and would accordingly be classified as perch type feeders. Many other birds prefer to feed from branches of trees and bushes while hanging or clinging therefrom and hence would be classified as clinging type feeders. It should be, however, recognized that a considerable number of birds may assume either of the above indicated broadly classified feeding attitudes, for instance, birds such as titmice, goldfinch, and chickadees, while classified as clinging birds, also will feed while sitting on top of a branch or other support.

Generally, bird feeders of known construction either provide access for all birds or the feeders are of different sizes for different type birds. Accordingly, it has been found desirable to provide a single feeder having the capability of successfully feeding all these different types of birds.

Also representative of prior art feeders are constructions wherein a hood is disposed generally vertically above a feed assembly so as to protect such from the elements such as rain and snow and also to form a shield so that squirrels and other related pests are prevented or deterred from gaining access to the feed contained therewithin. Such hoods normally take the form of disc or dome shaped constructions, adjustable in varying positions above the feed assembly. However, it is often possible for squirrels while hanging by their hind legs to bypass such a hood and undesirably gain access to the feed. Accordingly, it would be desirable to reduce or prevent such access without expanding the hood dimensions to undesirably large dimensions in relationship to the feed assembly, which has been done in the present invention by supporting the feed assembly from its overlying protective hood in a novel manner.

Further desirable attributes of feeder constructions include the ability of such feeder to reduce feed spillage, to be effectively utilized in high or moderate winds, to provide for protection against rain or other precipitation entering the feed container, and to generally simultaneously assure a constant supply of feed for birds of both the clinging and nonclinging varieties.

SUMMARY OF THE INVENTION

The present invention accomplishes these above indicated aims while further avoiding prior art shortcomings by the provision of a bird feeder construction having a feed assembly comprising a container and feed platform combination and an associated protective hood, said feed assembly and hood being interconnected by means comprising a rigid primary rod on which the hood is longitudinally adjustable. Said container includes a peripheral top portion defining an upper feed access opening for nonclinging or perch feed type birds and said feed platform includes peripheral portions having a plurality of lower feed access openings for cling feeding type birds. The hood is preferably of dome-shaped configuration having an outwardly an downwardly extending portion terminating in a peripheral portion laterally spaced from the peripheral portions of the feed assembly. The feed assembly is also preferably pivotally connected through its suspension from the hood by means of a secondary relatively rigid rod which is in turn interconnected with the lower terminal portions of the first connecting rod. Such an interconnection accordingly permits relatively independent pivotal movement of both the hood and the feed assembly with respect to each other.

It is accordingly a primary object of this invention to provide a bird feeder construction in which an upper feed access opening is provided for birds of the noncling feeding type and a plurality of lower feed access openings are provided for birds of the cling feeding type and wherein an overhanging hood is longitudinally movable relative to said feed assembly so as to selectively permit access of desired birds to said upper feed opening.

Another primary object of the instant invention is to provide a bird feeder construction in which a feed assembly is suspended longitudinally beneath and generally laterally inward of a protective hood member by means of generally rigid centrally disposed connection means and wherein the feed assembly is independently pivotally movable with respect to said hood member.

Still another main object of the present invention is the provision of a bird feeder construction wherein a generally bowl-shaped container for receipt of feed material therein is supported by a feed platform disposed therebeneath wherein openings in the base of the container provide access for feed material within the container to pass downwardly into the feed platform and wherein such openings are so disposed in relation to the plurality of feed access openings in said platform that a properly controlled supply of feed is always available at said feed access openings without undue seed waste, either through gravity run-out or wind-driven spillage.

Further objects of the present invention include the provision of a bird feeder construction which protects the feed container thereof not only from rain or wind-driven precipitation, but also from unwanted species, including pests such as squirrels and the like and which affords easy access for refilling; which provides positive means to assure the availability of seed within the container and feed platform for both nonclinging and clinging type birds and wherein bird recognition of the availability of seed within the container is accomplished.

Other objects, features, and advantages of the invention will become apparent when the description thereof proceeds when considered in connection to accompanying illustrative drawings.

DESCRIPTION OF THE DRAWING

In the drawings which illustrate the best mode presently contemplated for carrying out the present invention:

FIG. 1 is a perspective view of a combined bird feeder construction illustrating the several features and novel aspects of the present invention;

FIG. 2 is a side elevational view of the overall bird feeder combination of the present invention wherein both the upper feed access and the lower feed access openings are clearly respectively available to both perch feed and clinging feed type birds;

FIG. 3 is a top plan view thereof as viewed through the transparent hood member thereof;

FIG. 4 is a bottom plan view thereof;

FIG. 7 is a partial sectional view in a somewhat stylized manner showing the buildup of feed within the feed platform as viewed along the line 7—7 of FIG. 3.

DESCRIPTION OF THE INVENTION

Figure 5:
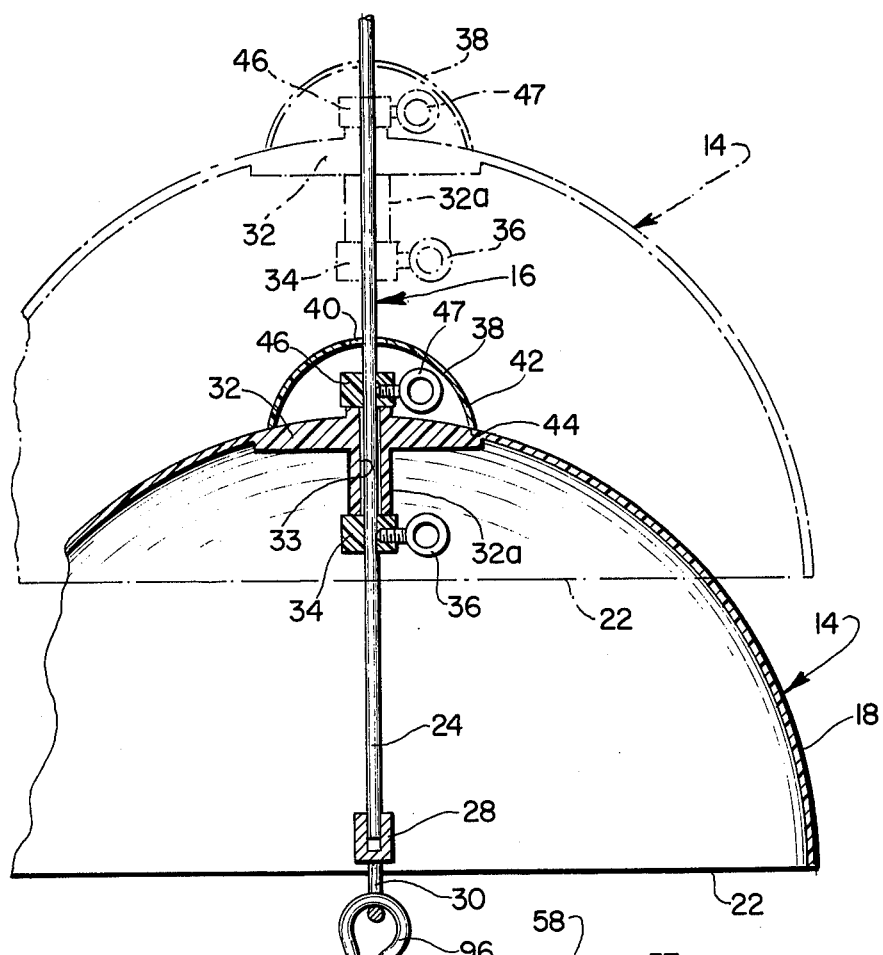
FIG. 5 is a partial sectional front elevational view taken along the line 5—5 of FIG. 2 and showing the manner in which the hood member is longitudinally movable relative to the feed assembly.
Figure 6:
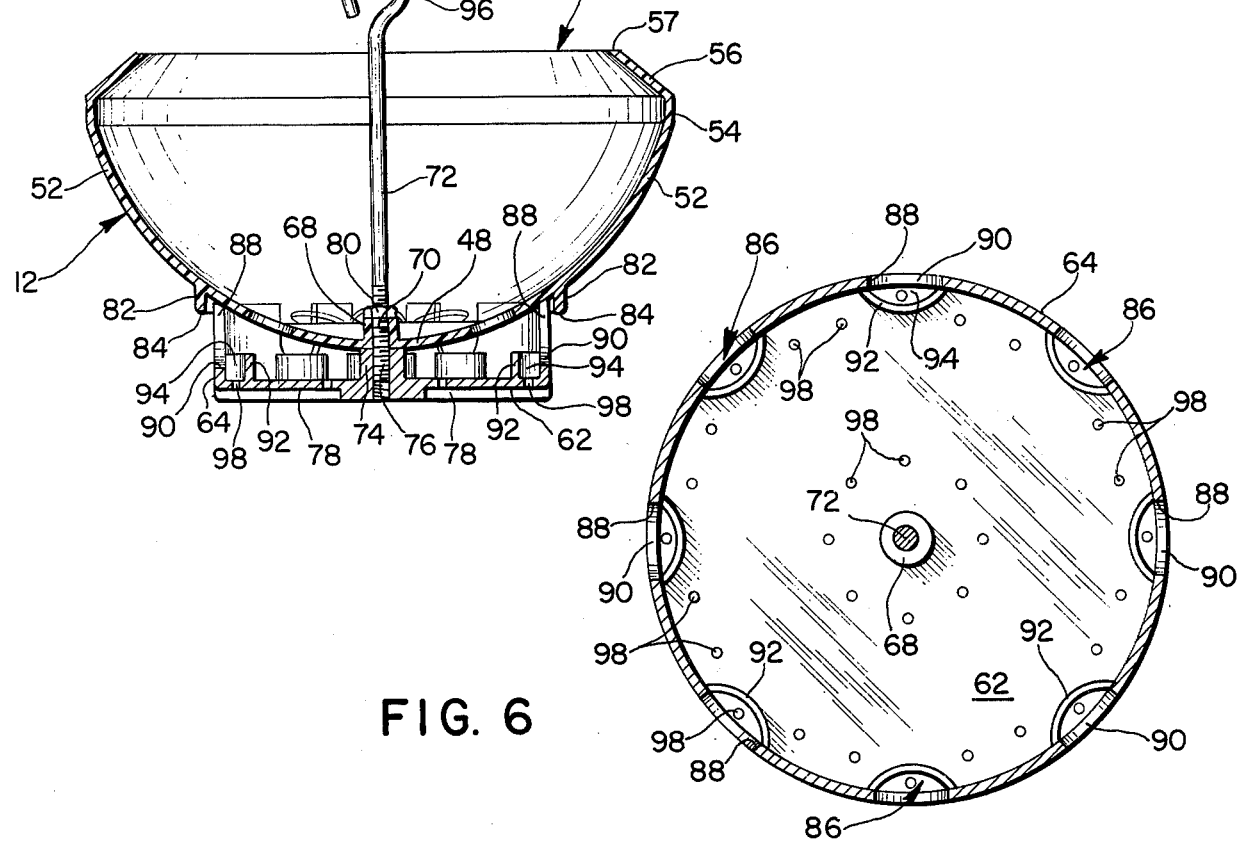
FIG. 6 is a top plan view taken along the line 6—6 of FIG. 2 and showing in particular the platform portions of the feed assembly.

The bird feeder construction 10 of the present invention is depicted as comprising a feed assembly 12 and a protective hood member 14 disposed in longitudinally vertical alignment with each other by means of a connection means 16. The hood member 14 is preferably transparent or at least translucent and formed of plastic resinous material such as acrylic or the like and of a generally dome-shaped configuration having outwardly downwardly extending sidewalls 18 emanating from a top portion 20 and terminating in a lower terminal peripheral edge 22.

The connection means 16 includes a primary generally rigid rod-like member 24 having means at its upper end in the form of a hook 26 or the like for suspending the feeder 10 and a connector 28 at its lower terminus including a suspension device such as the ring 30. The primary rod 24 is adapted to pass through a thickened hood reinforcing sector, i.e., boss 32 provided at the top portion 20 of the hood 14, as shown most clearly in FIG. 5. Such boss 32 includes an integral downwardly extending cylindrical portion 32a adapted to rest on a collar 34 which may be releasably secured to the primary rod 24 by means of a twist screw 36 or other equivalent securing means. In this way, then hood 14 is releasably secured in a desired longitudinal or vertical attitude with respect to the primary rod 24 and the feed assembly 12, as will hereinafter be more clearly brought out.

Additionally, the upper portion 20 of the hood is provided with a cover 38 having a central opening 40 for receipt of the primary rod 24 and preferably of dome-like configuration resting on the hood and having downwardly outwardly extending sidewalls terminating in a generally circular edge 44 adapted to engage the hood and accordingly serves to enclose the opening 33 provided in the top 20 thereof as well as a secondary collar 46, similar to collar 34, and adapted for securement with the primary rod above the portion 20 of the hood member so as to restrain the hood from upward movement, such as might be brought about by wind or accidental contact with trees, branches and the like. Also, although the collars, rods and various other components of the feeder 10 are preferably formed of weather-resistant material, the cover 38 serves to protect the upper collar from weather and also prevents rain or moisture from passing through opening 33, such as might tend to wet or dampen the feed housed within the feeder. The cover 38 also provides protection against squirrels chewing on the otherwise exposed collar 46 or its screw retention means 47 associated therewith.

The feed assembly 12 is comprised of a container 50 preferably, as as depicted, of bowl-like configuration having upwardly and outwardly directed sidewalls 52 terminating in a straight collar 54 from which an upwardly and inwardly directed upper flange 56 extends, terminating at inner peripheral edge 57 so as to define a central opening 58 in the top of the container 50. This opening 58 serves as the upper feed access opening for nonclinging or perch type feeding birds. Access of such birds to the opening 58 is afforded by providing an appropriate vertical or longitudinal spacing between the lower edge 22 of the hood and the container 50 of the feed assembly 12, which may be accomplished, as previously indicated, by upward or downward adjustment of the collars 34 and 46. Also by varying the spacing between the hood 12 and the container 50, is a dimension which will admit some perch feed type birds may be arrived at, but which also will prevent entry by larger perch type birds. Such dimensions can be determined by progressively lowering the hood 12 until its lower edge 22 is at least laterally in line with the container terminal edge 57.

The base of the container 50 is provided with a plurality of generally equidistantly spaced and preferably circular openings 59 which permit seed to move from the container 50 downwardly into a feed platform 60 which in turn includes a generally flat base 62 having upwardly extending peripheral sidewalls 64. Such sidewalls terminate in a generally circular ledge 66 which is adapted to receive, that is, contact sidewall portions of the container 50 so as to support the latter in the position illustrated. The lateral extent of the sidewalls 64 is such that they completely surround the grouping of the openings 59. The base of the container 50 also includes an upwardly extending boss 68 which is in turn provided with an internal bore 70 passing completely therethrough and adapted for receipt of a secondary relatively rigid rod-like member 72. The base 62 of the platform 60 is similarly provided with an upwardly extending boss portion 74 having an internally threaded bore 76 passing entirely therethrough. The base 62 of the platform 60 is further provided on its bottom surface with a plurality of outwardly radiating reinforcing ribs 78 so as to assure the necessary rigidity thereof.

As may best be seen by reference to FIG. 5 of the drawings, the rigid rod 72 by threadably engaging bore 76 serves to positively interconnect the platform and container portions of the feed assembly 12. The nut 80 serves to lock the feed assembly in longitudinal position and prevent it from moving up the rod 72 which could take place by movement inparted thereto by wind etc. Alternatively the bore 76 could be smooth i.e., unthreaded, and the lower portion of the secondary rod project downwardly from the base portion of the platform so as to receive a second nut (not shown) and thus serve to interconnect the platform 60 with the container 50 in this alternate manner.

The container 50 is provided with a downwardly extending flange 82 which preferably terminates in a rounded peripheral bead 84. Such flange 82 is radially outwardly offset from the outer extent of the platform sidewalls 64 and thus serves to better initially locate the positioning of the platform 60 with respect to the container 50. Such flange 82 further serves as a drip edge wherein precipitation i.e., rain, moving downwardly along the container sidewalls 52 collects and is diverted thereby and drips from the rounded edge 84 thereof. The flange, in addition to the above features, further by its downwardly projection past the circular contact line between the sidewalls 52 and the inner circular peripheral ledge 66 of the sidewalls 64 serves to block wind or moisture from entering therebetween.

It can best be apparent from reference to FIG. 2 of the drawings that a plurality of lower feed access openings 86 are provided by means of a plurality of downwardly extending notches 88 formed in the sidewalls 64 of the feed platform 60. Such notches 88 terminate at base portions 90 at a height just slightly above the upper surface of the base 62 of the platform 60. The notches are of lateral and longitudinal dimensions such that small clinging birds may cling thereto and simultaneously project their heads inwardly through the openings 86 to gain access to feed present on the platform by reason of its passage through the plurality of openings 59 in the container 50. It should also be brought out at this time that whereas the container and hood portions of the feeder 10 are preferably formed of transparent or at least translucent material, such as the acrylics, so as to enable birds, as well as people, to observe the presence of seed within the container 50; the platform 60, which may be of any suitable material, such as polycarbonate, is preferably colored so that the notches 88 therein may be more easily seen by the birds. Additionally, radially inwardly of each notch 88 is positioned a generally semi-circular baffle 92 upwardly extending from the base 62 of the platform 60 to a terminal height which projects above the edge 90 of each notch 88. The above described relationship between the base and baffle portions forms a well 94 therebetween which by reason of its relationship with the feed openings 59 thereabove, enables seed such as specifically shown in FIG. 7, to pile upwardly behind said baffle and provide a relatively seed free well area 94 to prevent seed from spilling out of openings 86. In addition, small clinging type birds may grasp the slight upwardly extending base portions below edge 90 without encountering obstruction from seed piled up directly there behind. It is also important that the height of the base portions below edges 90 be slight inasmuch as this reduces the wall extent available for grasping by larger undesirable animals, such as squirrels and the like.

Additionally, so that various types and sizes of feed can be utilized with ease, that is, with assurance that seed will be available but will not overly spill by gravity flow out of the lower feed access openings 86; the number of feed openings 59 provided is not equal but rather is preferably less than the number of lower feed access openings 86. As depicted, there may be six openings 59 and 8 lower access openings 86. Because the relative number of openings above described is unequal, at least some of the openings 59 are staggered in their radial alignment with openings 86. In those cases where alignment or substantial alighnment exists, a greater amount of seed is able to reach the sidewalls 64 of the platform 60 and in those cases where there is total or substantial misalignment, a lesser amount of seed moves to the position where it is accessible through the lower feed access openings 86. By providing for the above described partial alignment, a controlled balance is achieved so that generally the proper amount of feed moves through the openings 59 and piles up on the upper surface of the base 62 and against either the sidewall 64 or the baffle 92. In this manner then the feeder is adapted to take all kinds of seed ranging from large sunflower seeds to very small seed such as thistle seeds with assurance that sufficient large seed will be present adjacent each feed opening 88 and with equal assurance that not too much small seed will accumulate adjacent each opening.

It is also important that the size of the openings 59 be large enough to assure the flow of enough seed to the feed platform. A desirable feed flow for a variety of feeds has been found to take place with six openings, each 1⅛ inch in diameter and radially offset a distance of 1¾ inches from the center line of the container 50, when such container is circular and of a 6 inch diameter, when combined with eight notches 88 similarly equidistantly spaced and extending about 1¼ inches in height and of an approximate width of ⅜ inch.

Squirrels and other pests are further deterred from reaching seed within the container by the relative dimensioning of the hood 14 so that a squirrel hanging by its hind legs from the primary rod 24 cannot reach over the hood into the container. Also, if the squirrel lets go of the rod 24 or the hood and attempts to catch the seed platform as he passes by in mid air, the feed assembly 12 tends to swing away by reason of its pivotal suspension from the rod 24. Such pivotal suspension is accomplished by means of engaging an upper terminal hook 96 of the secondary rod 72 within the terminal ring 30 of the rigid rod 24. The feed assembly 12 is thus free to swing independently of the hood. Such feature also enables the feed assembly 12 to remain relatively stable when the hood 14 swings in the wind, and thus further contributes to reduced seed spillage such as might be caused by wind or the like. Also, the quick-detach connection between ring 30 and hook 96 enables the feed assembly to be readily detached to facilitate refilling of the latter, whenever necessary or desirable.

Rain or moisture which may enter the platform is dried out by circulation of air through the holes 98 provided in the base 62 of the feed platform.

It should also be understood that the various embodiments either singly or in combination with the above described constructions forming the novel features of the present invention may be utilized in a non-suspended form, that is, mounted on an upright pole. In such cases the pole may either entirely project through the openings 76, 70, and 33, respectively, provided in the central bosses of the feed platform, feed container and the hood member or may alternatively be provided with a threaded upper terminus which would threadedly connect to threaded bore 76 and then a second rigid rod would extend upwardly from bore 76, through bore 70 and opening 33. It will be understood that in any non-suspended assembly, there will be no pivotal connection between the hood 14 and the container 12, nor is any needed, since any movement of the feeder by wind or the like is negligible and also because squirrels or the like would now approach the feeder from below, rather than from above.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bird feeder and the like comprising a feed assembly including means for storing and dispensing feed, a hood member in non-contacting position above said feed assembly for diverting rain and unwanted species from access thereto, said feed assembly pivotally suspended and independently movable with respect to said hood and including a container for receipt of feed material, said container having a peripheral top edge defining an upper feeding access opening to permit non-cling type feeding birds feeding access thereto and forming a perch for such non-clinging birds and a feed platform disposed adjacent the bottom portion of said container and defining at least one lower feeding access opening to permit cling type feeding birds feeding access thereto, said hood downwardly outwardly extending and terminating in a peripheral portion positioned laterally outward of the peripheral extent of said feed assembly, connection means longitudinally orientated with respect to said bird feeder for interconnecting and positioning said feed assembly and said hood member in spaced respect to each other, and means for varying the longitudinal spacing between said hood and said feed assembly from a first position wherein said feed assembly is located at least partially within but still spaced from said hood so as to reduce feeding access to said upper opening and a second position wherein the lower edge of said hood is substantially above said feed assembly to thereby increase feeding access to said upper opening.

2. The feeder construction of claim 1, said connection means including a relatively rigid primary rod passing through said hood and to which said position varying means is attached, a second relatively rigid rod having its upper terminus pivotally interconnected to said primary rod at the lower terminus thereof, said secondary rod connected at the other end thereof to said feed assembly.

3. The feeder construction of claim 1, wherein said container portion of said feed assembly includes a plurality of bottom openings through which feed may pass from said container to said platform, the peripheral portions of said platform extending upwardly from a base portion thereof towards said container so as to substantially surround and enclose said bottom openings thereof.

4. The feeder construction of claim 5, said feed assembly platform including a relatively flat base having peripheral side walls upwardly extending therefrom and terminating in contact with wall portions of said container at a position laterally outwardly of the extent of said bottom openings therethrough, said sidewalls having a plurality of downwardly extending notches therein, said notches forming said lower feed access openings wherein feed from said container passing through said bottom openings reaches said platform base and is accessible through said notches to birds clinging to sidewall edge portions defining said notches.

5. The feeder construction of claim 4, said platform base including a plurality of feed diverting baffles positioned inwardly of each of said notches so as to form an inwardly extending generally open well behind the base of each notch.

6. The feeder construction of claim 5, each of said baffles upwardly extending to a height slightly above the base of said notches.

7. The feeder construction of claim 4, said container being generally of circular bowl shape having upwardly outwardly extending sidewalls and wherein the peripheral sidewalls of said feed assembly base contact said container sidewalls substantially above the outer lateral extent of said container bottom feed openings.

8. The feeder construction of claim 7, said container bottom feed openings disposed generally equidistantly from each other in a generally circular path and wherein the number of said openings is not equal to the number of feed access notches in said base sidewalls so that at least some of said openings are staggered in their radial alignment with said notches.

9. The feeder construction of claim 7, said container having a generally circular flange downwardly projecting from said sidewalls thereof at a position outwardly laterally offset from the peripheral extent of said feed platform.

10. The feeder construction of claim 9 wherein the lower terminus of said flange is rounded so as to facilitate the drip of water therefrom.

11. The feeder construction of claim 9 wherein said flange is disposed at a lateral position immediately proximate to and projects downwardly past the upper terminus of said feed platform sidewalls.

12. The feeder construction of claim 7, said connection means including a relatively rigid primary rod passing through said hood and to which said position varying means is attached, a second relatively rigid rod having its upper terminus pivotally interconnected to said primary rod at the lower terminus thereof, said feed platform base having a centrally disposed upwardly directed internally threaded boss, said boss threadedly receiving the lower end of said secondary rod so as to be supported thereby, said container resting on said base, whereby said secondary rod supports both said base and said container.

13. The feeder construction of claim 12 wherein said container is additionally supported by sidewall contact thereof with said platform sidewalls.

14. The feeder construction of claim 2 wherein said position varying means comprises a collar mounted on said primary rod and vertically slidable therewith and means for fixing the position of said collar on said primary rod, said hood adapted to supportively rest on said collar.

15. The feeder construction of claim 14 wherein holding means are positioned directly above the upper surface of said hood so as to prevent upward movement thereof.

16. The feeder construction of claim 15 wherein said holding means comprises an adjustable secondary collar and wherein a cover is positioned about said primary rod and above said holding means and includes laterally extending peripheral portions in contact with said upper hood surface.

17. The feeder construction of claim 4 further characterized in that said hood and said container portion of said feed assembly are at least translucent so as to enable seed within the container to be visible and at least the peripheral side walls of said feed assembly platform are colored so as to increase the visibility of the clinging bird notch perches thereof.

18. A bird feeder and the like comprising a feed assembly including means for storing and dispensing feed, a protective outwardly flared hood member positioned thereabove and laterally terminating beyond the extent of said assembly, connection means for interconnecting and positioning said hood member and said feed assembly with respect to each other, said connection means including a relatively rigid primary rod passing through said hood and a second relatively rigid rod, the upper terminus of which is directly pivotally interconnected to said primary rod at the lower terminus thereof, said secondary rod further supporting said feed assembly for free swinging movement independent of movement of said hood.

19. The feeder construction of claim 18, said feed assembly including a feed container portion of bowl-like configuration, said container having an open top, a base and upwardly outwardly directed sidewalls, said container top opening defining an upper feed access opening for nonclinging birds, and a platform disposed adjacent the bottom portions of said container, said platform having peripheral openings defining lower feed access openings for clinging birds.

20. The feeder construction of claim 19 wherein said hood, container and platform are generally of circular configuration and said connection means are disposed generally axially centrally thereof, said container sidewalls further including an inwardly directed flange, the inner periphery thereof defining said container top opening and means for varying the longitudinal spacing between said hood and said assembly to vary the access of nonclinging birds to said upper feed opening.

21. The feeder construction of claim 20, said feed platform and said container base each having an axially disposed upwardly directed boss, said bosses in relative contact with each other and with said secondary rod at its lower terminus so as to cooperatively support said feed assembly.

22. A bird feeder and the like including a feed assembly comprising a container for receipt of feed material having an open peripheral top portion defining an upper feed access opening and a perch for nonclinging birds and a feed platform disposed about the bottom portions of said container and having peripheral portions defining a plurality of lower feed access openings and perches for clinging type birds, said container bottom portion including a plurality of openings to permit feed to pass from said container to said platform, the peripheral portions of said platform extending upwardly from a base portion thereof towards said container so as to substantially surround and enclose said bottom openings thereof, said feed container being bowl-like and having a generally circular configuration with upwardly outwardly extending sidewalls and wherein said platform includes a relatively flat base having peripheral sidewalls upwardly extending therefrom and terminating in a generally circular edge in contact with said container sidewalls, said platform sidewalls having a plurality of downwardly extending notches therein, said notches forming said lower feed access openings wherein feed on said platform base is accessible through said notches to birds clinging to side wall edge portions defining said notches, said platform base including a plurality of feed diverting baffles of a height slightly above the base of said notches positioned inwardly of each of said notches so as to form an inwardly extending generally open seed-free well behind the base of each lower feed access opening, said container bottom feed openings disposed generally equidistantly from each other in a generally circular path and wherein the number of said openings is different from the number of feed access notches in said base sidewalls so that at least some of said openings are staggered in their radial alignment with said notches.

23. The feeder construction of claim 22, said container being generally semicircular and having substantially a six inch diameter and having six base openings therethrough, each of an approximate 1⅛ inch diameter and spaced from the longitudinal axis of said container a distance of approximately 1¾ inches, said platform sidewall being of an approximate 6 inch diameter and having eight equidistantly spaced notches of an approximate 1⅛ inch height.

24. The feeder construction of claim 22, said platform base having a plurality of drain openings therethrough.

25. The feeder construction of claim 22, said container having a circular flange downwardly extending from the sidewalls thereof, said platform sidewalls inwardly disposed in contacting relationship with said flange so as to position said platform in lateral relationship with said container.

26. The feeder construction of claim 25, said feed platform base having a centrally disposed upwardly directed internally threaded boss, said secondary rod being provided with a threaded lower terminus interconnected with said boss, said container resting on said base, whereby said secondary rod supports said base and said container.

* * * * *